United States Patent
Ji et al.

(10) Patent No.: US 11,107,423 B2
(45) Date of Patent: Aug. 31, 2021

(54) METHOD AND DEVICE FOR CONTROLLING BACKLIGHT, AND DISPLAY DEVICE

(71) Applicant: Hisense Visual Technology Co., Ltd., Qingdao (CN)

(72) Inventors: Kaihu Ji, Qingdao (CN); Bin Wang, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 16/887,594

(22) Filed: May 29, 2020

(65) Prior Publication Data

US 2020/0413508 A1 Dec. 31, 2020

Related U.S. Application Data

(63) Continuation of application No. PCT/CN2019/121388, filed on Nov. 28, 2019.

(30) Foreign Application Priority Data

Jun. 27, 2019 (CN) .......................... 201910570434.8

(51) Int. Cl.
*G09G 3/34* (2006.01)
*H05B 45/10* (2020.01)
(Continued)

(52) U.S. Cl.
CPC .......... *G09G 3/3406* (2013.01); *G09G 3/342* (2013.01); *H05B 45/10* (2020.01); *H05B 45/325* (2020.01);
(Continued)

(58) Field of Classification Search
CPC ..... G09G 3/34–3696; G09G 2330/026; G09G 2330/02–022; G09G 3/3426; G09G 2320/064
See application file for complete search history.

(56) References Cited

U.S. PATENT DOCUMENTS 5,511,201 A * 4/1996 Kamimaki ........... G09G 3/3406
713/310
10,170,057 B2 * 1/2019 Zhang .................. G09G 3/3426
(Continued)

FOREIGN PATENT DOCUMENTS

| CN | 101252659 A | 8/2008 |
| CN | 103050095 A | 4/2013 |

(Continued)

OTHER PUBLICATIONS

Office action from Chinese Application No. 201910570434.8 dated Aug. 5, 2020 (9 pages).

*Primary Examiner* — Sanjiv D. Patel
(74) *Attorney, Agent, or Firm* — Harness, Dickey & Pierce, P.L.C.

(57) ABSTRACT

The disclosure discloses a method and device for controlling backlight of a screen of a display device, and a display device. The method includes: generating backlight control information and caching the backlight control information, by a main controller, in response to an instruction for awakening the display device; starting, by the main controller, a backlight controller, to initialize the backlight controller; and outputting, by the main controller, the backlight control information to the backlight controller, in response to completion of initialization of the backlight controller, to cause the backlight controller to control the backlight of the screen of the display device according to the backlight control information.

10 Claims, 9 Drawing Sheets

(51) Int. Cl.
*H05B 45/325* (2020.01)
*G06F 1/3234* (2019.01)

(52) U.S. Cl.
CPC ..... *G06F 1/3265* (2013.01); *G09G 2320/064* (2013.01); *G09G 2320/0626* (2013.01); *G09G 2330/026* (2013.01)

(56) References Cited

U.S. PATENT DOCUMENTS

| | | | | |
|---|---|---|---|---|
| 2010/0227651 | A1* | 9/2010 | Kim | H04M 1/0266 455/566 |
| 2016/0293115 | A1* | 10/2016 | Yamashita | G09G 3/3406 |
| 2018/0122307 | A1* | 5/2018 | Li | G09G 3/36 |
| 2018/0350308 | A1* | 12/2018 | Zhang | G09G 3/3426 |
| 2019/0287466 | A1* | 9/2019 | Yin | G09G 3/3406 |

FOREIGN PATENT DOCUMENTS

| | | | |
|---|---|---|---|
| CN | 103366702 | A | 10/2013 |
| CN | 104011783 | A | 8/2014 |
| CN | 104332140 | A | 2/2015 |
| CN | 105469768 | A | 4/2016 |
| CN | 105632414 | A | 6/2016 |
| CN | 106658194 | A | 5/2017 |
| CN | 108182912 | A | 6/2018 |
| CN | 108447454 | A | 8/2018 |
| CN | 109377951 | A | 2/2019 |
| CN | 109377952 | A | 2/2019 |
| CN | 109637461 | A | 4/2019 |
| CN | 110277069 | A | 9/2019 |
| JP | H11344957 | A | 12/1999 |
| KR | 10-20180078969 | A | 7/2018 |

* cited by examiner

METHOD AND DEVICE FOR CONTROLLING BACKLIGHT, AND DISPLAY DEVICE

This application is a continuation of International Application No. PCT/CN2019/121388 filed Nov. 28, 2019, which claims priority to Chinese patent application 201910570434.8 filed Jun. 27, 2019. The entire disclosures of the above applications are incorporated herein by reference.

FIELD

The present disclosure relates to screen backlight control of a display device, in particular to a method and device for controlling backlight of a screen of a display device, and a display device.

BACKGROUND

This section provides background information related to the present disclosure which is not necessarily prior art.

In order to reduce manufacture cost of a display device, a feasible solution is to remove a Micro-Controller Unit (MCU) for controlling screen backlight of the display device from the display device, and realize screen backlight control of the display device through software, thus saving the manufacture cost of the display device.

For removing the MCU and realizing backlight control through the software, how to control screen backlight while ensuring a screen effect of the display device is now a problem to be solved.

SUMMARY

This section provides a general summary of the disclosure, and is not a comprehensive disclosure of its full scope or all of its features.

The embodiments of the present disclosure provide a method and device for controlling backlight of a panel of a display device, and a display device.

In a first aspect, the embodiments of the present disclosure provide a display device, including: a panel; a backlight source configured to provide backlight for the panel; a main controller configured to: in response to an instruction for awakening the display device, generate backlight control information and cache the backlight control information; start a backlight controller to initialize the backlight controller; and in response to completion of initialization of the backlight controller, output the backlight control information to the backlight controller, to cause the backlight controller to control the backlight source according to the backlight control information; and the backlight controller configured to: start initialization in response to a startup control command from the main controller; and control the backlight source in response to the backlight control information output from the main controller.

In a second aspect, the embodiments of the present disclosure provide a method for controlling backlight of a panel of a display device, including: generating backlight control information and caching the backlight control information, by a main controller, in response to an instruction for awakening the display device; starting, by the main controller, a backlight controller, to initialize the backlight controller; and outputting, by the main controller, the backlight control information to the backlight controller, in response to completion of initialization of the backlight controller, to cause the backlight controller to control a backlight source of the display device according to the backlight control information.

In a third aspect, the embodiments of the present disclosure provide a device for controlling backlight of a screen of a display device, including: a backlight control information generating module, configured to generate backlight control information and cache the backlight control information in response to an instruction for awakening the display device; a backlight controller controlling module, configured to start a backlight controller to initialize the backlight controller; and a backlight control information outputting module, configured to output the backlight control information to the backlight controller in response to completion of initialization of the backlight controller, to cause the backlight controller to control a backlight source of the display device according to the backlight control information.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A exemplarily shows a schematic diagram of an operation scenario between a display device and a control device.

FIG. 1B exemplarily shows a configuration block diagram of a control device 100 in FIG. 1A.

FIG. 1C exemplarily shows a configuration block diagram of a display device 200 in FIG. 1A.

FIG. 1D exemplarily shows an architecture configuration block diagram of an operating system in a memory of a display device 200.

Corresponding reference numerals indicate corresponding parts or features throughout the several views of the drawings.

DETAILED DESCRIPTION

Example embodiments will now be described more fully with reference to the accompanying drawings.

Figure 1A:
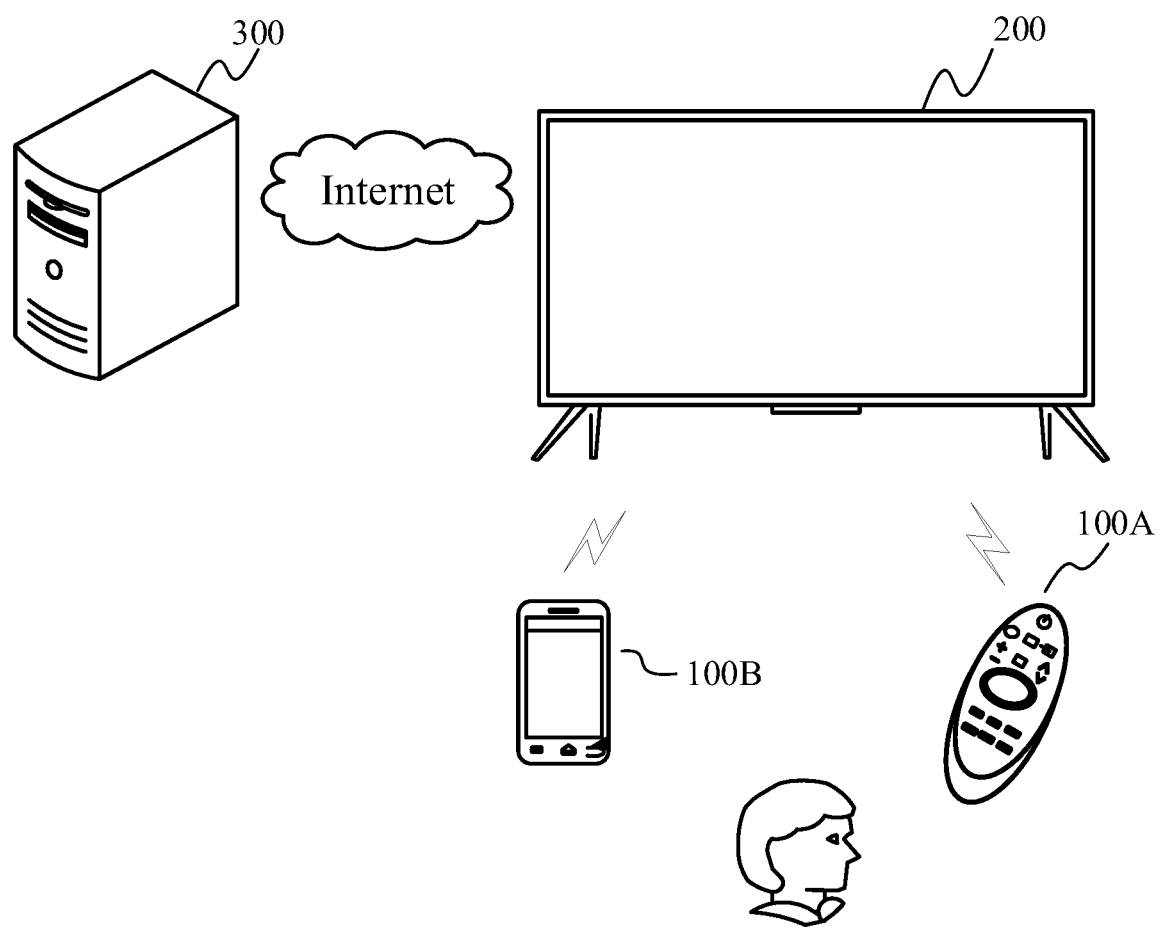

FIG. 1A exemplarily shows a schematic diagram of an operation scenario between a display device and a control device. As shown in FIG. 1A, a control device 100 and a display device 200 communicates with each other in a wired or wireless manner.

The control device 100 controls the display device 200. The control device 100 receives an operation command input from a user and converts the operation command into an instruction, which can be recognized and responded to by the display device 200, thus acting as an interaction between the user and the display device 200. For example, when the user operates channel up and channel down buttons on the control device 100, the display device 200 responds to the operation to move to the next channel or go back to a previous one.

The control device 100 may be a remote control 100A. The remote control 100A may communicate by infrared protocol communication, Bluetooth protocol communication, or other short-range communication. The remote control 100A can control the display device 200 in a wired or wireless manner. The user can control the display device 200 by inputting user instructions through buttons on the remote control 100A, by voice, through a control panel, etc. For example, the user can input corresponding control instructions through volume up and volume down buttons, channel control buttons, up/down/left/right navigation buttons, voice input buttons, menu buttons, an on/off button and the like on the remote control to achieve the functions of controlling the display device 200.

The control device 100 may further be a smart device, such as a mobile terminal 100B, a tablet computer, a computer and a notebook computer. For example, the display device 200 is controlled by using one or more application programs running on the smart device. The one or more application programs can be configured to provide users with various control functions through an intuitive user interface (UI) on a screen associated with the smart device.

By way of example, software applications can be installed on the mobile terminal 100B associated with the display device 200, and connection communication is realized through a network communication protocol, thus realizing the purposes of one-to-one control and data communication. For example, one or more control instruction protocol may be established between the mobile terminal 100B and the display device 200, and the functions of buttons physically arranged on the remote control 100A can be realized by operating various function keys or virtual buttons on the user interface provided on the mobile terminal 100B. Audio and video contents displayed on the mobile terminal 100B may further be transmitted to the display device 200 to realize a synchronous display function.

The display device 200 may have a broadcast receiving function and a computer-supported web TV function. The display device may be implemented as a digital TV, web TV, Internet Protocol TV (IPTV), etc.

The display device 200 may be a liquid crystal display, organic light emitting display, or projection device. The specific type, size and resolution of the display device are not limited herein.

The display device 200 further performs data communication with servers 300 through various communication methods. Here, the display device 200 may be allowed to realize communication connection through a local area network (LAN), a wireless local area network (WLAN), and other networks. The servers 300 may provide various contents and interactions to the display device 200. By way of example, the display device 200 may send and receive information such as receiving electronic program guide (EPG) data, receiving software program updates, or having access to a remotely stored digital media library. There may be one group or multiple groups of servers 300, of one type or multiple types. Other network service contents such as video-on-demand and advertisement service are provided through the servers 300.

Figure 1B:
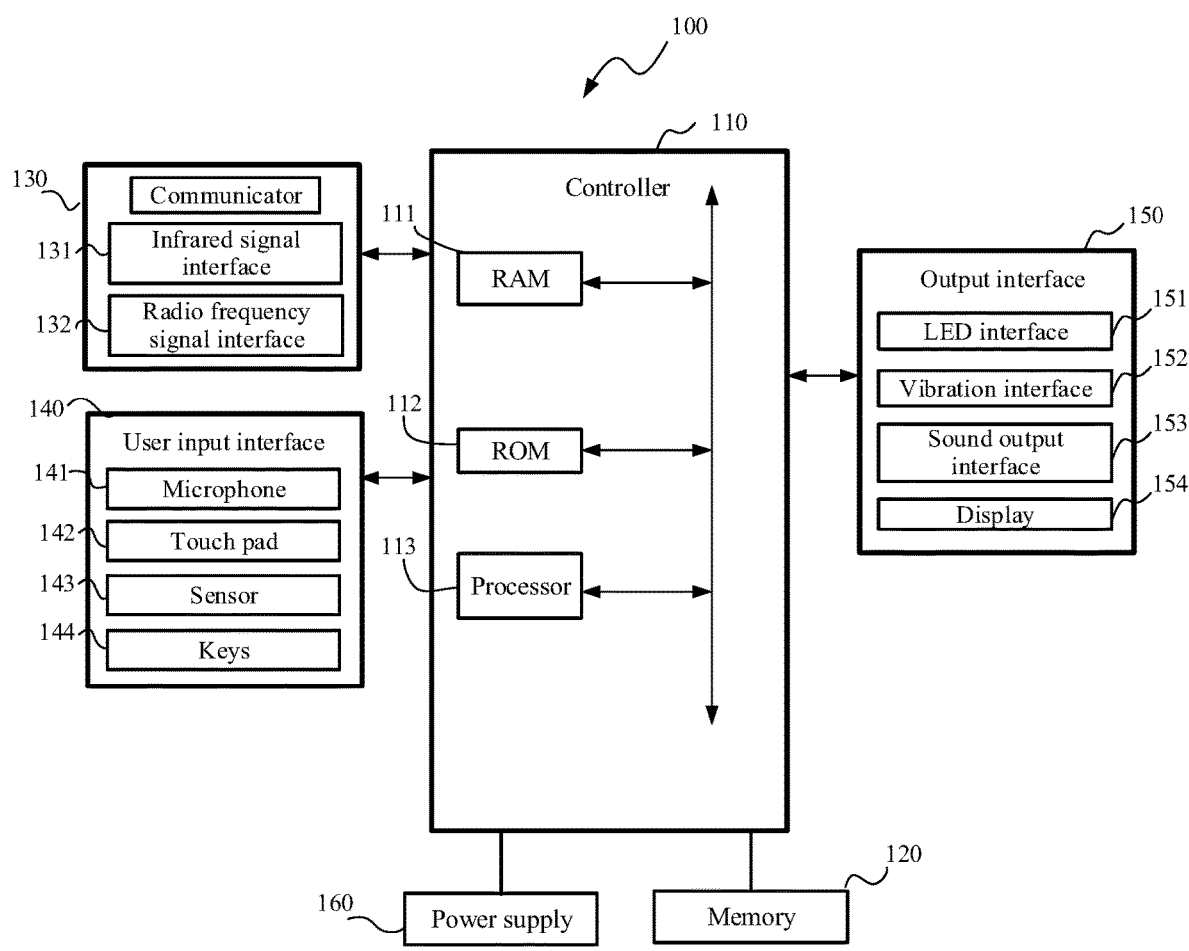

FIG. 1B exemplarily shows a configuration block diagram of the control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read only memory (ROM) 112, a processor 113, a communication interface, and a communication bus. The controller 110 is used for controlling the operation of the control device 100, as well as communication cooperation between internal components and external and internal data processing functions.

By way of example, when an interaction such as a user pressing a button on the remote control 100A or a user touching a touch panel on the remote control 100A is detected, the controller 110 may be controlled to generate a signal corresponding to the detected interaction and transmit the signal to the display device 200.

The memory 120 is used for, under control of the controller 110, storing various operating programs, data and applications which drive and control the control device 100. The memory 120 may store various control signal instructions input from the user.

Communication of control signals and data signals between the communicator 130 and the display device 200 is realized under control of the controller 110. For example, the control device 100 transmits the control signals (e.g., a touch signal or a button signal) to the display device 200 via the communicator 130, and the control device 100 may receive the signals transmitted from the display device 200 via the communicator 130. The communicator 130 may include an infrared signal interface 131 and a radio frequency signal interface 132. For example, in the case of the infrared signal interface, a user input instruction needs to be converted into an infrared control signal according to an infrared control protocol and then sent to the display device 200 via an infrared sending module. As another example, in the case of the radio frequency signal interface, the user input instruction needs to be converted into a digital signal, then modulated according to a radio frequency control signal modulation protocol, and then transmitted to the display device 200 by a radio frequency transmission terminal.

The user input interface 140 may include at least one of a microphone 141, a touch pad 142, a sensor 143, keys 144, and the like, so that the user may input a user instruction for controlling the display device 200 to the control device 100 through voice, touch, gestures, press, and the like.

The output interface 150 outputs the user instruction received from the user input interface 140 to the display device 200, or outputs an image or voice signal received from the display device 200. Here, the output interface 150 may include an LED interface 151, a vibration interface 152 which generates vibration, a sound output interface 153 which outputs sounds, a display 154 which outputs images, and the like. For example, the remote control 100A may receive output signals such as audio, video, or data from the output interface 150, and display the output signals in an image form on the display 154, in an audio form on the sound output interface 153, or in a vibration form on the vibration interface 152.

The power supply 160 is used for providing running power support for each component of the control device 100 under control of the controller 110. The power supply may take the form of batteries and related control circuits.

Figure 1C:
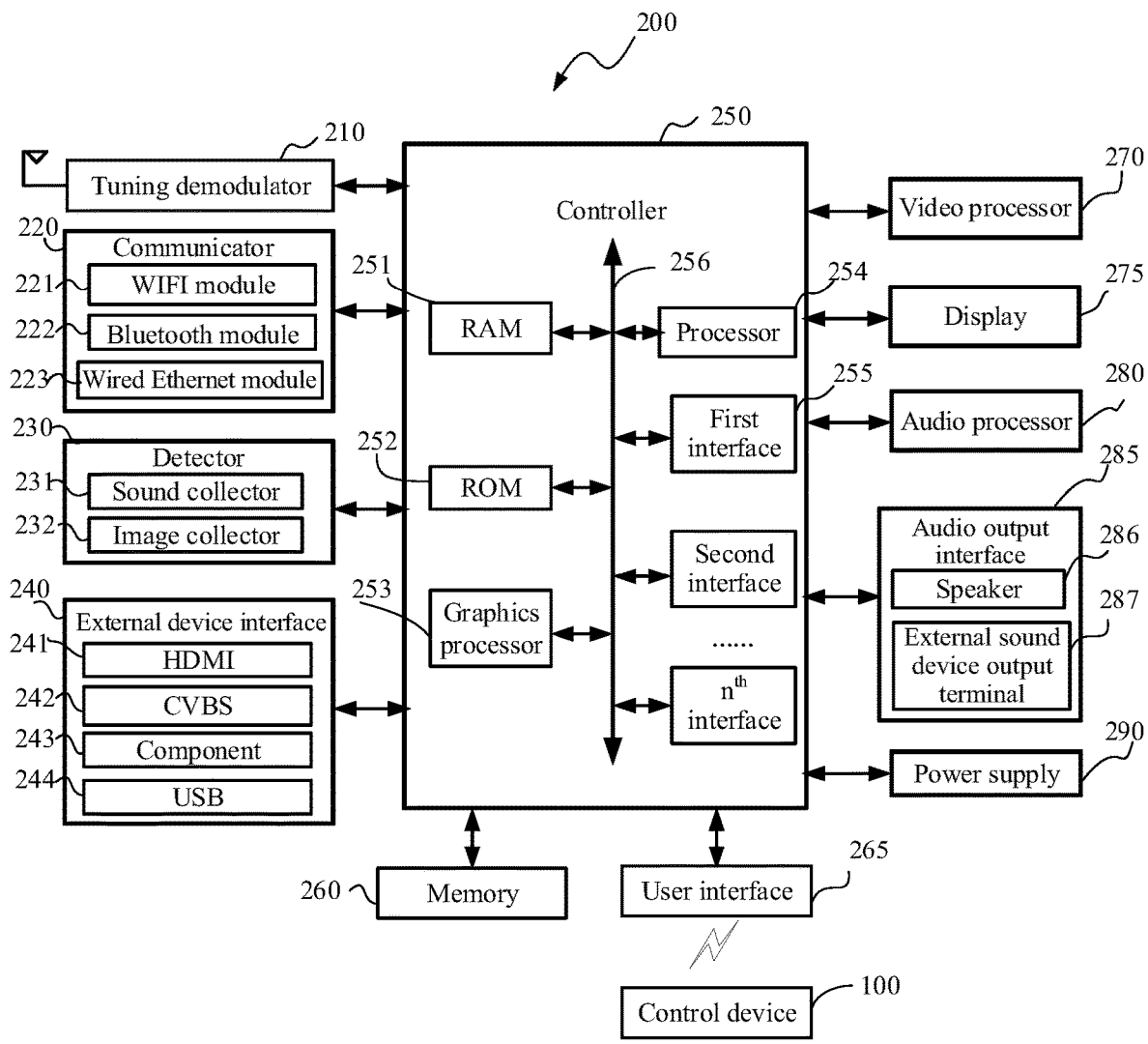

FIG. 1C exemplarily shows a hardware configuration block diagram of the display device 200. As shown in FIG. 1C, the display device 200 may include a tuning demodulator 210, a communicator 220, a detector 230, an external device interface 240, a controller 250, a memory 260, a user interface 265, a video processor 270, a display 275, an audio processor 280, an audio output interface 285, and a power supply 290.

The tuning demodulator 210 receives broadcasting television signals in a wired or wireless manner, and can perform modulation and demodulation processing such as amplification, mixing and resonating to demodulate audio and video signals carried by a frequency of the television channel selected by a user and additional information (e.g., EPG data) from the plurality of wireless or wired broadcasting television signals.

The tuning demodulator 210 can make response to the frequency of the television channel selected by the user and the television signals carried by the frequency according to a user selection and control of the controller 250.

The tuning demodulator 210 can receive signals in many ways such as terrestrial broadcasting, cable broadcasting, satellite broadcasting or Internet broadcasting according to different transmitting systems of the television signals. In terms of different modulation types, the tuning demodulator can adopt a digital modulation manner or an analog modulation manner. Depending on different types of received television signals, the tuning demodulator can demodulate analog signals and digital signals.

In other exemplary embodiments, the tuning demodulator 210 may further be in an external device, such as an external set-top box. In this way, the set-top box outputs television signals after modulation and demodulation, and the television signals are input to the display device 200 through an external device interface 240.

The communicator 220 is a component for communicating with an external device or an external server according to various communication protocol types. For example, the display device 200 may transmit content data to the external device connected via the communicator 220, or browse and download content data from the external device connected via the communicator 220. The communicator 220 may include network communication protocol modules such as a WIFI module 221, a Bluetooth communication protocol module 222 and a wired Ethernet communication protocol module 223, or a near field communication protocol module, so that the communicator 220 may receive a control signal of the control device 100 according to control of the controller 250, and implements the control signal as a WIFI signal, Bluetooth signal, radio frequency signal, etc.

The detector 230 is a component of the display device 200 to collect signals of an external environment or signals for interaction with the outside. The detector 230 may include a sound collector 231, such as a microphone, which may be used for receiving sounds, such as a voice command signal of a user for controlling the display device 200; or may be used for collecting environmental sounds for identifying the type of environmental scenes, enabling the display device 200 to adapt to environmental noise.

In other exemplary embodiments, the detector 230 may further include an image collector 232, such as a camera and a webcam, which may be used for collecting external environment scenes to adapt to the display parameters of the display device 200, and further used for collecting user attributes or interacting gestures from a user to realize interaction between the display device and the user.

In other exemplary embodiments, the detector 230 may further include a light receiver for collecting ambient light intensity to adapt to the display parameters of the display device 200.

In other exemplary embodiments, the detector 230 may further include a temperature sensor, for example, by sensing the ambient temperature, the display device 200 may adaptively adjust the display color temperature of an image. By way of example, in a high-temperature environment, the color temperature of the image displayed by the display device 200 can be adjusted to be in cold tune; and in a low-temperature environment, the color temperature of the image displayed by the display device 200 can be adjusted to be in warm tone.

The external device interface 240 is a component which allows the controller 250 to control data transmission between the display device 200 and the external device. The external device interface 240 may be connected to the external device such as a set-top box, a game device and a notebook computer in a wired/wireless manner, and may receive data such as video signals (e.g., moving images), audio signals (e.g., music) and additional information (e.g., EPG) of the external device.

The external device interface 240 may include any one or more of a high definition multimedia interface (HDMI) terminal 241, a composite video blanking synchronization (CVBS) terminal 242, an analog or digital component terminal 243, a universal serial bus (USB) terminal 244, a component terminal (not shown in the figure), and a red-green-blue (RGB) terminal (not shown in the figure).

The controller 250 controls work of the display device 200 and responds to user operation by running various software control programs (such as an operating system and various applications) stored on the memory 260.

As shown in FIG. 1C, the controller 250 includes a random access memory (RAM) 251, a read only memory (ROM) 252, a graphics processor 253, a CPU 254, a communication interface 255, and a communication bus 256. The RAM 251, the ROM 252, the graphics processor 253, the CPU 254 and the communication interface 255 are connected through the communication bus 256.

The ROM 252 is used for storing various system boot instructions. For example, when receiving a startup signal, the display device 200 is powered on, and the CPU 254 runs the system boot instructions in the ROM 252 and copies the operating system stored in the memory 260 into the RAM 251 so as to start running the operating system. After the operating system is started, the CPU 254 copies various applications in the memory 260 into the RAM 251, and then starts to run the various applications.

The graphics processor 253 is used for generating various graphics objects, such as icons, operation menus, and display graphic elements for user input. The graphics processor 253 may include an arithmetic unit for performing arithmetic by receiving various interactive instructions input from a user, and further displaying the various objects according to display attributes; and a renderer for generating various objects obtained based on the arithmetic unit and displaying rendered results on the display 275.

The CPU 254 is used for running the operating system instructions and applications stored in the memory 260, and processing various applications, data and contents according to the instructions received from user input so as to finally display and play various audio and video contents.

In some exemplary embodiments, the CPU 254 may include multiple processors. The multiple processors may include a main processor and one or more sub-processors. The main processor is used for running some initialization operations of the display device 200 in a preload mode of the display device, and/or running image display operation in a normal mode. One or more sub-processors are used for executing an operation in a standby mode of the display device.

The communication interface 255 may include a first interface to an nth interface. These interfaces may be network interfaces connected with the external device via network.

The controller 250 may control overall operation of the display device 200. For example, in response to receiving a user input instruction for selecting a GUI object displayed on the display 275, the controller 250 may perform operations associated with the object selected by the user input instruction.

The object may be any one of selectable objects, such as a hyperlink or icon. The operation associated with the selected object may be displaying a page, document, or image linked to the hyperlink, or executing an application corresponding to the object. The user input instruction for selecting the GUI object may be an instruction input through various input devices (e.g., a mouse, a keyboard, and a touch pad) connected with the display device 200 or a voice instruction corresponding to what is spoken by the user.

The memory 260 is used for storing various types of data, software programs or applications which drive and control operations of the display device 200. The memory 260 may be a volatile and/or nonvolatile memory. The term "memory" includes the memory 260, the RAM 251 and ROM 252 of the controller 250, or a memory card in the display device 200.

In some embodiments, the memory 260 is used for storing operating programs which drive the controller 250 of the display device 200; storing various applications built in the display device 200 and downloaded by a user from an external device; and storing data such as visual effect images for configuring various GUIs provided by the display 275, various objects related to the GUIs, and a selector for selecting the GUI objects.

In some embodiments, the memory 260 is used for storing driving programs and related data of the tuning demodulator 210, the communicator 220, the detector 230, the external device interface 240, the video processor 270, the display 275, and the audio processor 280, such as external data (e.g., audio and video data) received from the external device interface or user data (e.g., key information, voice information, and touch information) received from the user interface.

In some embodiments, the memory 260 stores software and/or programs for showing an operating system (OS), and the software and/or programs may include, for example, a kernel, middleware, an application programming interface (API), and/or applications. By way of example, the kernel may control or manage system resources and functions implemented by other programs (such as the middleware, API or applications); and besides, the kernel can provide interfaces to allow the middleware, API or application programs to have access to the controller so as to control or manage the system resources.

Figure 1D:
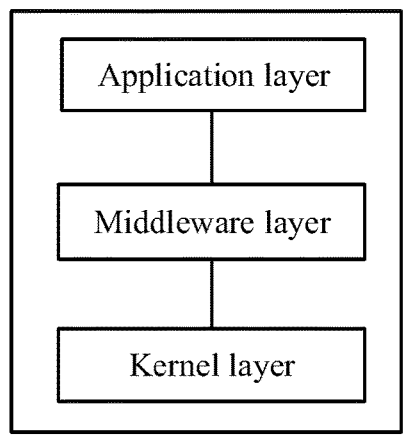

FIG. 1D exemplarily shows an architecture configuration block diagram of an operating system in the memory of the display device 200. From top to bottom, the operating system includes an application layer, a middleware layer and a kernel layer in order.

Applications built in the system and non-system applications all belong to the application layer. The application layer is responsible for direct interaction with a user. The application layer may include a plurality of the applications, such as setting application, E-pos application, and media center application. These applications can be implemented as Web applications, which are executed based on a WebKit engine, and specifically can be developed and executed based on HTML5, cascading style sheets (CSS), and JavaScript.

Here, HTML, short for HyperText Markup Language, is a standard markup language used for creating web pages. The web pages are described by markup tags. HTML tags are used for describing texts, graphics, animations, sounds, tables, links, etc. The browser reads HTML documents, explains the contents of tags in the documents, and displays them in the form of web pages.

CSS, short for Cascading Style Sheets, is a computer language used for describing HTML file styles and can be used for defining style structures such as fonts, colors, and locations. CSS styles can be directly stored in HTML web pages or individual style files to control styles in the web pages.

JavaScript is a language for Web page programming, which can be inserted into the HTML pages and interpreted and executed by a browser. The interaction logic of Web applications is implemented through JavaScript. JavaScript can encapsulate a JavaScript extension interface through the browser to realize communication with the kernel layer.

The middleware layer can provide some standard interfaces to support operation of various environments and systems.

For example, the middleware layer can be implemented as an MHEG (Multimedia and Hypermedia Experts Group)-based middleware associated with data broadcasting, a DLNA middleware associated with communication with external device, or a middleware for providing a browser environment for the applications within the display device run.

The kernel layer provides core system services, such as file management, memory management, process management, network management, and system security permission management. The kernel layer may be implemented as a kernel based on various operating systems, for example, a Linux-based kernel operating system.

The kernel layer further provides communication between system software and hardware, providing device driving services for various hardware, such as: providing a display driving program for the display, providing a camera driving program for the camera, providing a button driving program for the remote control, providing a WIFI driving program for the WIFI module, providing an audio driving program for the audio output interface, and providing a power management driving program for the power management (PM) module.

The user interface 265 receives various user interactions. Specifically, the user interface is used for transmitting user input signals to the controller 250, or transmitting an output signal from the controller 250 to the user. By way of example, the remote control 100A may send the input signals such as a power switch signal, a channel selection signal, and a volume adjustment signal input from the user to the user interface 265, and then the input signals are transmitted to the controller 250 through the user interface 265; and alternatively, the remote control 100A may receive output signals such as audio, video, or data output from the user interface 265 processed by the controller 250, and display the received output signals or output the received output signals in the form of audio or vibration.

In some embodiments, a user may enter a user instruction through a graphical user interface (GUI) displayed on the display 275, and the user interface 265 receives the user input instruction through the GUI. Specifically, the user interface 265 may receive a user input instruction for controlling a selector position on the GUI, so as to select different objects or items.

Alternatively, a user may enter a user instruction by inputting a specific sound or gesture, and the user interface 265 receives the user input instruction by recognizing the sound or gesture through a sensor.

The video processor 270 is used for receiving external video signals, and performing video data processing such as decompressing, decoding, scaling, denoising, frame rate conversion, resolution conversion, and image synthesization according to the standard coding and decoding protocol of the input signals so as to obtain video signals which can be directly displayed or played on the display 275.

By way of example, the video processor 270 includes a demultiplexing module, a video decoding module, an image synthesizing module, a frame rate converting module, a display formatting module and the like.

The demultiplexing module is used for demultiplexing input audio and video data streams, for example, after inputting MPEG-2 streams, the demultiplexing module demultiplexes them into video signals and audio signals.

The video decoding module is used for processing the demultiplexed video signals, including decoding and scaling.

The image synthesizing module, such as an image synthesizer, is used for superimposing and mixing a GUI signal generated by a graphic generator according to user input or by itself with a scaled video image so as to generate an image signal for display.

The frame rate converting module is used for converting the frame rate of an input video, for example, converting an input video frame rate of 60 Hz into a frame rate of 120 Hz or 240 Hz, and a common method is realized by frame interpolation.

The display formatting module is used for converting a signal output from the frame rate conversion module into a signal conforming to a display format of the display and the like, for example, performing format conversion on the signal output from the frame rate conversion module to output an RGB data signal.

The display 275 is used for receiving image signals input from the video processor 270, and displaying video contents, images, and menu operation interfaces. The video contents displayed may come from the video contents in broadcast signals received by the tuning demodulator 210, or may come from the video contents input from the communicator 220 or the external device interface 240. The display 275 further displays a user operation interface UI generated in the display device 200 and used for controlling the display device 200.

The display 275 may include a display component for presenting images and a driving component for driving image display. Alternatively, if the display 275 is a projection display, it may further include a projection device and a projection screen.

The audio processor 280 is used for receiving external audio signals, and performing audio data processing such as decompressing, decoding, denoising, digital-to-analog conversion, and amplification according to the standard coding and decoding protocol of the input signals to obtain audio signals which can be played in a speaker 286.

By way of example, the audio processor 280 may support various audio formats, for example, MPEG-2, MPEG-4, Advanced Audio Coding (AAC), and High-Efficiency AAC (HE-AAC).

The audio output interface 285 is used for receiving audio signals output from the audio processor 280 under control of the controller 250. The audio output interface 285 may include a speaker 286 or an external sound device output terminal 287, such as an earphone output terminal, output to a sound generation device of the external device.

In other exemplary embodiments, the video processor 270 may include one or more chips. The audio processor 280 may further include one or more chips.

In some other exemplary embodiments, the video processor 270 and the audio processor 280 may be separate chips or may be integrated with the controller 250 in one or more chips.

The power supply 290 is used for providing power support for the display device 200 by inputting power from an external power source under control of the controller 250. The power supply 290 may be a built-in power supply circuit installed inside the display device 200 or a power supply installed outside the display device 200.

On the basis of the above-mentioned FIGS. 1A-1D, it should be noted that a display screen commonly used in the display device is a liquid crystal screen, which does not emit light itself, but illuminates the screen through the action of a backlight source to present images on the screen. In this case, the display device usually adopts a multi-partition dynamic backlight adjustment technology to control the brightness of the backlight source, specifically, a backlight of a panel of the display device is usually provided with a plurality of light strips (backlight source), and each light strip is used for controlling the brightness of one corresponding area on the panel of the display device. The brightness of each light strip can be independently controlled by a backlight controller, so that the panel of the display device is divided into a plurality of independent partitions, and the brightness of each partition can be independently controlled to better present the images.

Figure 2:
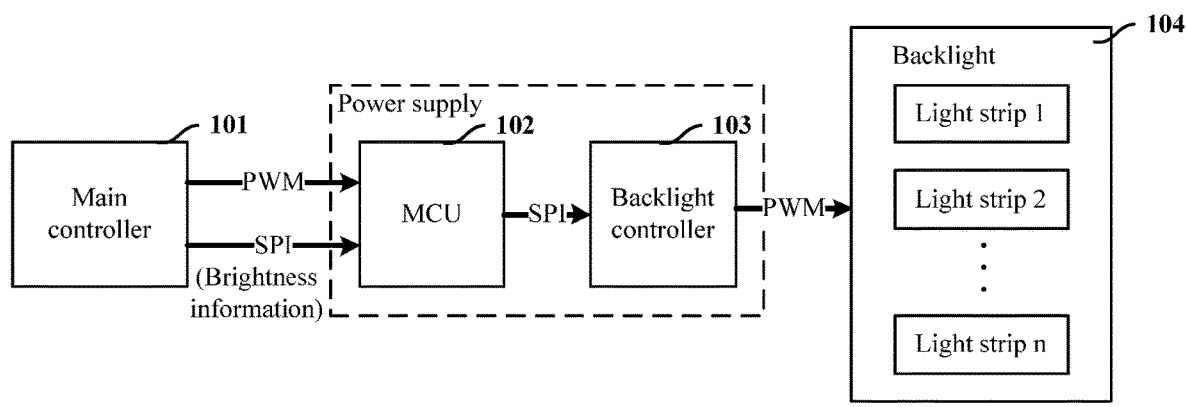
FIG. 2 is a schematic diagram of backlight control with a backlight control MCU.

FIG. 2 shows a backlight control schematic diagram where a backlight control MCU is arranged and a semiconductor laser device acts as a backlight source. Based on this architecture, the backlight control process after startup includes: the main controller 101 generates a Pulse Width Modulation (PWM) signal for backlight control and brightness information of each light strip based on dithering technology, and sends the PWM signal and brightness information of each light strip to the backlight control MCU 102, where the brightness information of each light strip is sent according to Serial Peripheral Interface (SPI) protocol; the backlight control MCU 102 performs integration and clipping on the processed PWM signal and brightness information of each light strip, and sends the processed brightness information of each light strip to the backlight controller 103; and the backlight controller 103 outputs a corresponding PWM signal according to the brightness information of each light strip, and adjusts the current of the corresponding light strip on the backlight 104 through the PWM signal, thereby controlling the brightness of the corresponding light strip, and further realizing brightness control over the corresponding partition.

According to FIG. 2, when the panel of the display device is lit (i.e., the backlight of the panel of the display device is turned on), the main controller 101 powers up the backlight control MCU 102, and the backlight control MCU 102 starts the backlight controller 103 for initialization. The main controller 101 generates the PWM signal and the light strip brightness information, and outputs the PWM signal and the light strip brightness information to the backlight control MCU 102. Integration of the input PWM signal and light strip brightness information by the backlight control MCU 102 is in parallel with the initialization process of the backlight controller 103. In this way, the backlight controller 103 completes initialization first, and then controls the brightness of the light strips after the backlight control MCU outputs the PWM signal for controlling the brightness of the light strips. Since the initialization of the backlight controller 103 is completed before output of the PWM signal for controlling the brightness of the light strips, that is, the initialization of the backlight controller 103 is keeping pace with backlight control data, and the backlight control data meet the panel startup timing required by the backlight controller 103, a blurred screen of the display device will be avoided.

In some embodiments, the main controller 101, the MCU 102, and the backlight controller 103 in FIG. 2 may be integrated, corresponding to the controller 250 in FIG. 1C.

Figure 3:
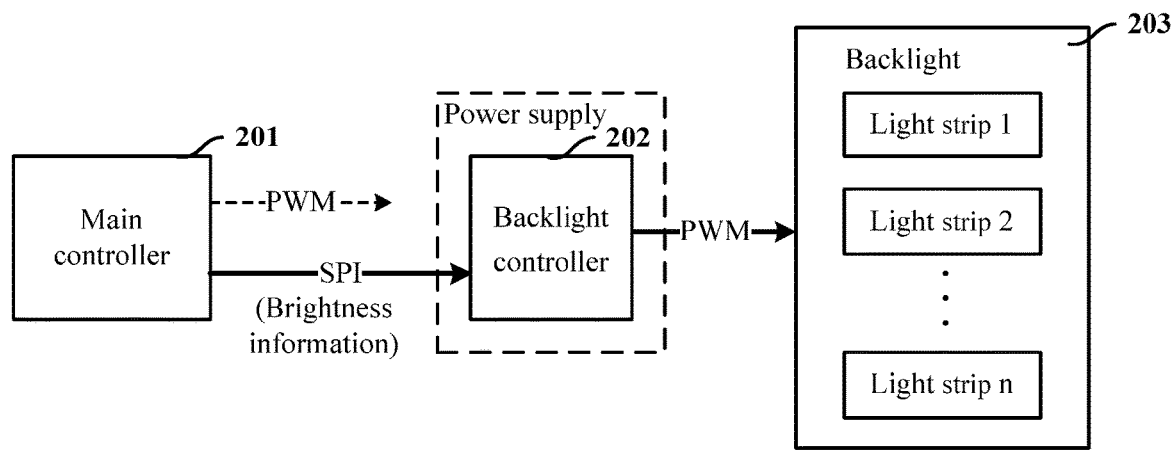
FIG. 3 is a schematic diagram of backlight control without a backlight control MCU.

FIG. 3 shows a backlight control schematic diagram where a backlight control MCU is removed and a semiconductor laser device acts as a backlight light source. Based on this architecture, the backlight control process after startup includes: the main controller 201 generates a PWM duty ratio value for backlight adjustment and brightness information of each light strip based on dithering technology, integrates the PWM duty ratio value and the brightness information of each light strip to obtain the integrated brightness information of each light strip, and sends the integrated brightness information of each light strip to the backlight controller 202 according to SPI protocol; and the backlight controller 202 outputs a corresponding PWM signal according to the brightness information of each light strip, and adjusts the current of the corresponding light strip on the backlight 203 through the PWM signal, thereby controlling the brightness of the corresponding light strip, and further realizing brightness control over the corresponding partition.

In the above embodiments, the main controller 201 can still output the PWM signal (shown by dotted lines in the figure), but the PWM signal is in suspension, that is, it will not be output to the backlight controller 202.

According to FIG. 3, during normal startup, the main controller 201 powers up the backlight controller 202, so that the backlight controller 202 starts initialization. Generation of the light strip brightness information by the main controller 201 is in parallel with initialization of the backlight controller 202. In this way, the backlight controller 202 is initialized first, and then controls the brightness of the light strips after the main controller 201 outputs the light strip brightness information.

Since the initialization of the backlight controller 202 is completed before output of the light strip brightness information, that is, the initialization of the backlight controller 202 and backlight control data are kept in pace, and the backlight control data meet the panel startup timing required by the backlight controller 202, a blurred screen of the display device will be avoided.

In some embodiments, the main controller 201 and the backlight controller 202 in FIG. 3 may be integrated, corresponding to the controller 250 in FIG. 1C.

The current display device mostly supports Suspend to RAM (STR) rapid start and various wake-up modes, such as Wi-Fi signal awakening. In some scenarios, when the display device is awakened by a Wi-Fi signal wake-up mode, the display device is required to be awakened without lighting the display panel (i.e. the backlight of the display panel has not been turned on) due to the needs of upper layer service logic. The display panel is lit (i.e. the display panel backlight is turned on) only when a user presses a power-on button on the remote control of the display device or sends a power-on command to the display device by other means or sends a media file needing to be played to the display device.

According to FIG. 3, if the display device is awakened by a Wi-Fi signal, the main controller 201 executes the above-described process of generating the light strip brightness information during awakening of the display device. When a user presses the power-on button on the remote control of the display device (or triggers the screen to be lit in other ways), the main controller 201 powers up the backlight controller 202 and outputs the previously generated light strip brightness information to the backlight controller 202; and after the backlight controller 202 is powered on, the main controller 201 controls the backlight controller 202 to be initialized according to the timing requirements of the backlight controller 202. In this way, output of the light strip brightness information is before the initialization of the backlight controller 202, that is, the initialization of the backlight controller 202 is not keeping pace with the backlight control data, and the backlight control data fails to meet the panel lighting timing required by the backlight controller 202. Since the initialization of the backlight controller 202 is not completed yet, and the state is not stable, backlight control according to the received light strip brightness information at this point will cause a temporary blurred screen of the display device and affect user experience.

For the backlight control architecture of the display device without the backlight control MCU, in order to solve the above problems, the embodiments of the present disclosure provide a backlight control method and associated device and apparatus. In the embodiments of the present disclosure, when the display device is awakened, the main controller of the display device generates backlight control information and caches the backlight control information; and when the main controller controls the backlight controller to turn on the display panel, the main controller outputs the cached backlight control information to the backlight controller after confirming that the initialization of the backlight controller is completed, so that the backlight controller can control the backlight of the display panel. The screen is not lit when the display device is awakened, and then the display panel will be lit later, the embodiments of the present disclosure can avoid a temporary blurred screen.

Hereinafter, the embodiments of the present disclosure will be described in detail with reference to the accompanying drawings.

Figure 4:
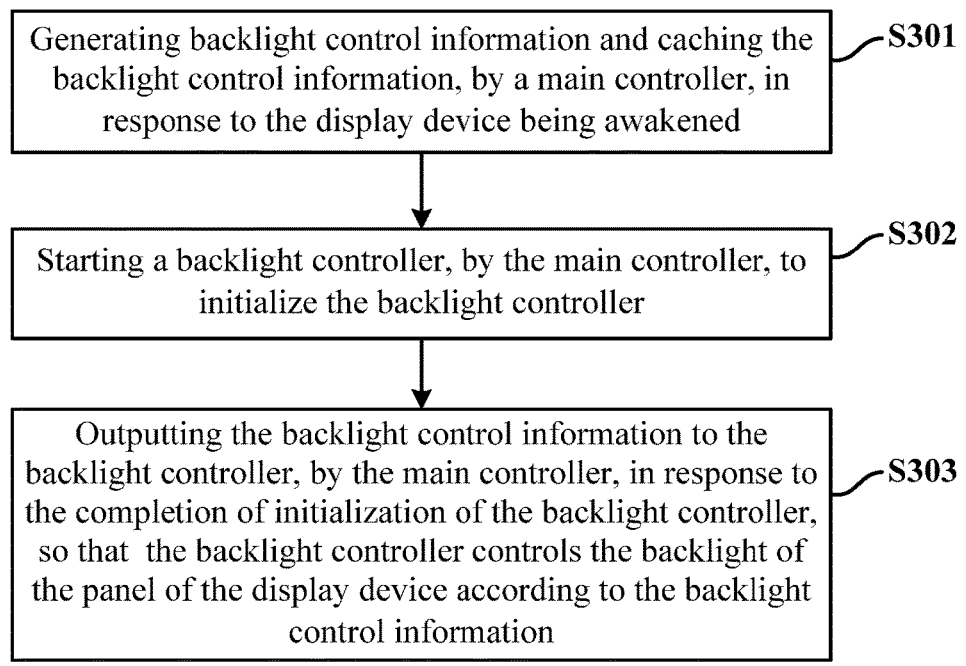
FIG. 4 is a flow diagram of backlight control according to embodiments of the present disclosure.

FIG. 4 is a flow chart of backlight control according to the embodiments of the present application. The flow can be applied to the backlight control architecture of the display device shown in FIG. 2, that is, the backlight control MCU is not included in the architecture. As shown in FIG. 4, the process includes S301 to S303.

S301: generating backlight control information and caching the backlight control information, by a main controller, in response to the display device being awakened.

In this step, when the display device is awakened, for example, by using a Wi-Fi signal, the main controller can generate the backlight control information and cache the backlight control information in response to the display device being awakened.

Figure 5:
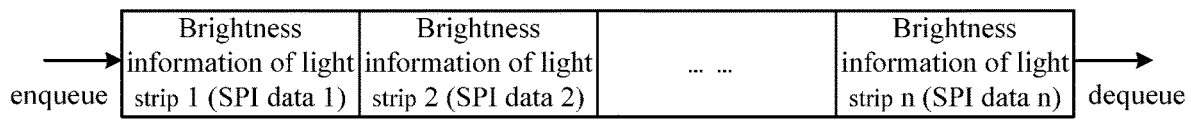
FIG. 5 is a schematic diagram of a cache queue of backlight control information cache queue according to embodiments of the present disclosure.

The backlight control information may include brightness information of at least one light strip. The plurality of light strips can be arranged on a backlight of the display device so as to realize partitioning brightness control over a panel of the display device. In some specific implementations, the backlight control information may include the brightness information of each light strip, and the brightness information of all the light strips may be cached in a queue. FIG. 5 exemplarily shows the light strip brightness information cached in a queue. The light strip brightness information can be stored in a data structure conforming to the SPI protocol.

It is noted that in the present embodiments, when the display device is awakened, the backlight of the display panel is kept off, that is, the display panel is not lit.

S302: starting a backlight controller, by the main controller, to initialize the backlight controller.

The main controller can output a startup signal to the backlight controller or provide power voltage to the backlight controller so as to start the backlight controller.

Here, the main controller may start the backlight controller in response to a command for turning backlight on. For example, the panel may not be lit when the display device is awakened, and the backlight of the display panel may be turned on after an instruction to turn on the backlight or an event for triggering the backlight to be turned on is received. For example, when a user presses an Power button on a remote control of the display device to turn on the display device, the remote control of the display device sends a command to the display device to turn on the backlight of the display panel; as another example, when the user sends a media playing request to the display device through a mobile terminal so as to request the display device to play a corresponding media file, the display device can be triggered to turn on the backlight.

S303: outputting the backlight control information to the backlight controller, by the main controller, in response to completion of initialization of the backlight controller, so that the backlight controller controls the backlight of the panel of the display device according to the backlight control information.

In this step, the backlight controller is initialized first after being started, the main controller determines whether the initialization of the backlight controller is completed, and in response to a determination that the initialization of the backlight controller has been completed, the cached backlight control information is output to the backlight controller.

In some embodiments of the present disclosure, the backlight controller may use the SPI protocol to output the backlight control information to the backlight controller.

In some embodiments of the present disclosure, in S303, the main controller may determine whether the initialization of the backlight controller has been completed or not in the following manner: the main controller acquires operation state indication information of the backlight controller, and determines whether the backlight controller is initialized or not according to the operation state indication information. During the initialization of the backlight controller, the operation state of the backlight controller is an abnormal operation state (such as, a reset state or other operation states), and after initialization is completed, the operation state of the backlight controller becomes a normal operation state. The backlight controller includes a plurality of registers, some of which are used for recording the operation state of the backlight controller. When the operation state of the backlight controller changes, corresponding operation state indication information can be written into the registers, that is, the current operation state of the backlight controller can be known by reading the registers.

In some embodiments of the present disclosure, in a bit sequence stored in the registers for recording the operation states of the backlight controller, one or more bits at different positions may indicate different meanings, for example, the value of the upper 3 bits indicates the operation state of the backlight controller. Correspondingly, in S303, the main controller can read the bit sequence of the registers used for identifying the operation state in the backlight controller and read the value of a subsequence at a specified position according to the bit sequence, wherein the value of the subsequence at the specified position is used for indicating the operation state of the backlight controller.

In some embodiments of the present disclosure, in S301, the main controller generates the backlight control information and caches the backlight control information in response to the display device being awakened by means of a predefined wake-up mode. The predefined wake-up modes include one or more wake-up modes which need to wake-up the display device without lighting the panel, including but not limited to a Wi-Fi wake-up mode. When the display device is awakened by means of the predefined wake-up mode, the panel backlight of the display device has not been turned on or lit, and the panel backlight of the display device is turned on upon receiving a command for turning backlight on. Specifically, when the display device is awakened, the main controller determines a wake-up mode of this wake-up, and if the display device is awakened by the above predefined wake-up mode, the main controller generates backlight control information and caches the backlight control information in the manner described above; and if the main controller determines that the display device is not wakened by the above-mentioned predefined wake-up mode, the main controller can process in a conventional manner, for example, the main controller generates the backlight control information, powers up the backlight controller (i.e., starting the backlight controller) and outputs the generated backlight control information to the backlight controller.

The main controller can determine the wake-up mode according to the type of an awakening signal or the source of an awakening command. For example, if a Wi-Fi module inside the display device receives a signal for awakening the display device, the main controller can be triggered to awaken the display device by using the predefined wake-up mode.

In some embodiments of the present disclosure, in S301, the process for the main controller to generate the backlight control information may include: generating the brightness information of at least one light strip on the backlight of the panel of the display device; generating a PWM duty ratio for backlight control; and according to the brightness information of the at least one light strip and the PWM duty ratio, obtaining the backlight control information.

In some embodiments of the present disclosure, in S301, the process for the main controller to obtain the backlight control information according to the brightness information of the at least one light strip and the PWM duty ratio may include: processing the brightness information of the at least one light strip and the PWM duty ratio to obtain the backlight control information. Processing includes: integrating the brightness information of the at least one light strip with the PWM duty ratio, and performing clipping processing on the integrated light strip control information.

Figure 6:
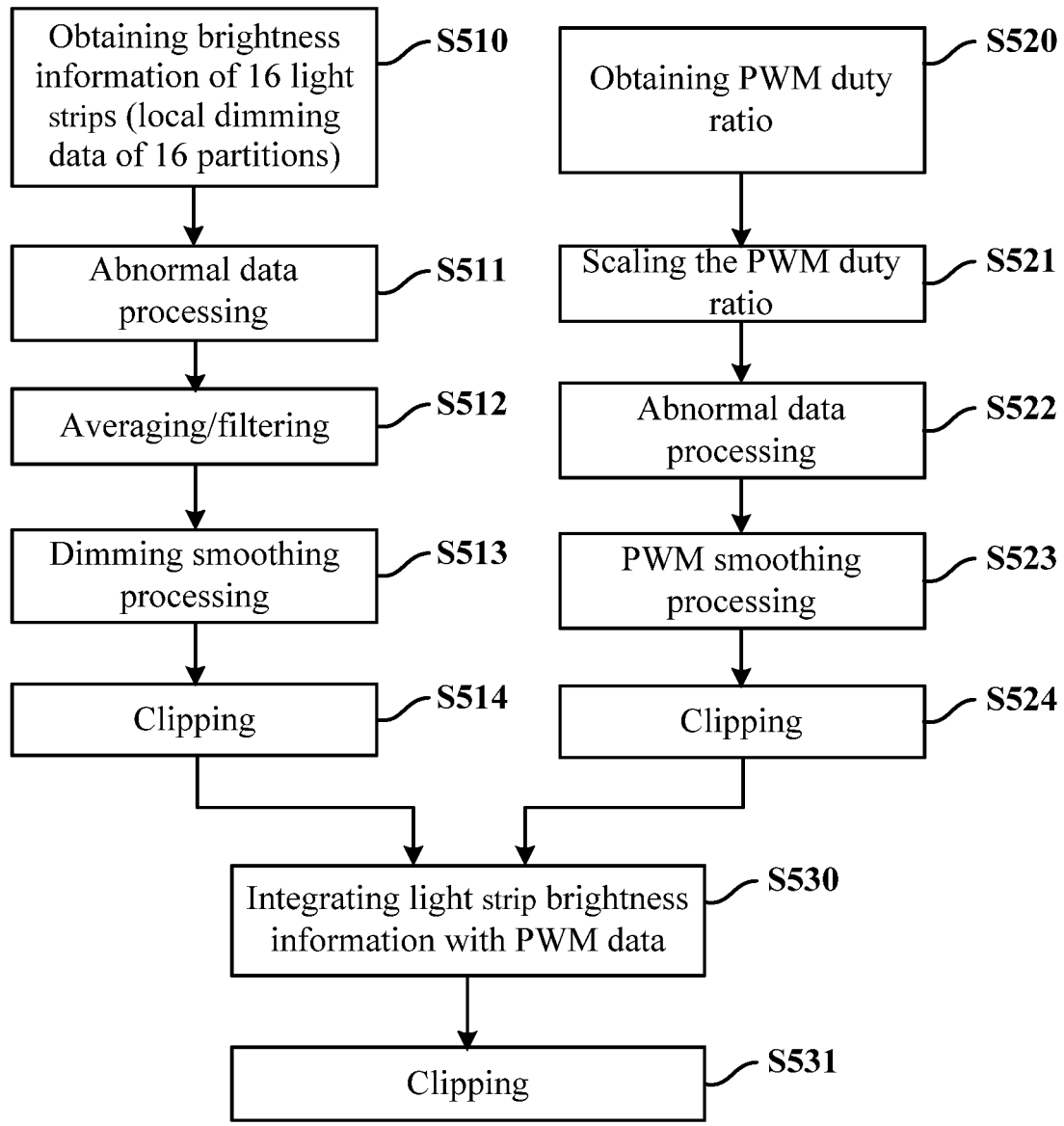
FIG. 6 is a process flow diagram of a main controller according to embodiments of the present disclosure.

FIG. 6 exemplarily shows a process for the main controller to generate the backlight control information. FIG. 6 illustrates the backlight control information generation and processing process of the main controller by assuming that 16 light strips are arranged on the backlight to divide the display panel into 16 partitions. As shown in FIG. 6, the process may include the following operations.

S510: obtaining light strip brightness information. In the present example, since there are 16 light strips corresponding to the 16 partitions of the display panel, local dimming data of the 16 partitions are obtained. In specific implementations, a kernel can generate the local dimming data, and the main controller can obtain the local dimming data of the 16 partitions from separate files of the data according to configuration data of the different partitions.

S511: performing abnormal data processing on the local dimming data, so as to remove abnormal data.

S512: averaging or filtering the local dimming data after the abnormal data processing.

S513: performing dimming smoothing processing on the averaged or filtered local dimming data.

S514: performing clipping process on the local dimming data after the smoothing processing.

S520: obtaining the PWM duty ratio.

The PWM duty ratio can be generated according to basic backlight and light perception. In specific implementations, the PWM duty ratio can be generated by middleware.

S521: scaling the PWM duty ratio.

S522: performing abnormal data processing on the scaled PWM duty ratio.

S523: performing PWM smoothing processing on the PWM duty ratio after the abnormal data processing.

S524: performing clipping processing on the PWM duty ratio after the smoothing processing.

S530-S531: integrating the local dimming data processed in S514 with the PWM duty ratio processed in S524, and clipping the integrated data to obtain the brightness information corresponding to the 16 light strips. The brightness information can be cached first and output to the backlight controller once initialization of the backlight controller is completed.

It is noted that in the flow shown in FIG. 6, the process of generating and subsequent processing of the light strip brightness information can be executed in parallel with the generation of the PWM duty ratio and subsequent processing for the PWM duty ratio.

In some embodiments, in the above flow shown in FIG. 6, during dimming smoothing processing, when image brightness changes, the dimming value of each partition is increased or decreased according to a certain step at a time interval of each frame, and the step after dimming is set to 3 so as to ensure uniform brightness change. The local dimming data is 8 bit and the PWM duty ratio data is 8 bit, the PWM duty ratio, as a global gain value, is multiplied by the brightness information of each partition, and then the multiplication result is converted into 12 bit required by the backlight controller, thereby combining the backlight control data and the local dimming data and inputting them to the backlight controller to control the backlight.

In some embodiments, in the above flow shown in FIG. 6, during PWM smoothing, real-time dynamic refresh data are compared with backup data in the previous execution cycle first, if the difference between the dynamic refresh data and the backup data is greater than or equal to a set threshold, a set step is adopted to adjust to a dynamic brightness value, and if the difference between the dynamic refresh data and the backup data is less than the set threshold, the dynamic refresh data this time are maintained. For example, the backlight brightness can be increased or decreased according to the step with a value of 1.

Figure 7:
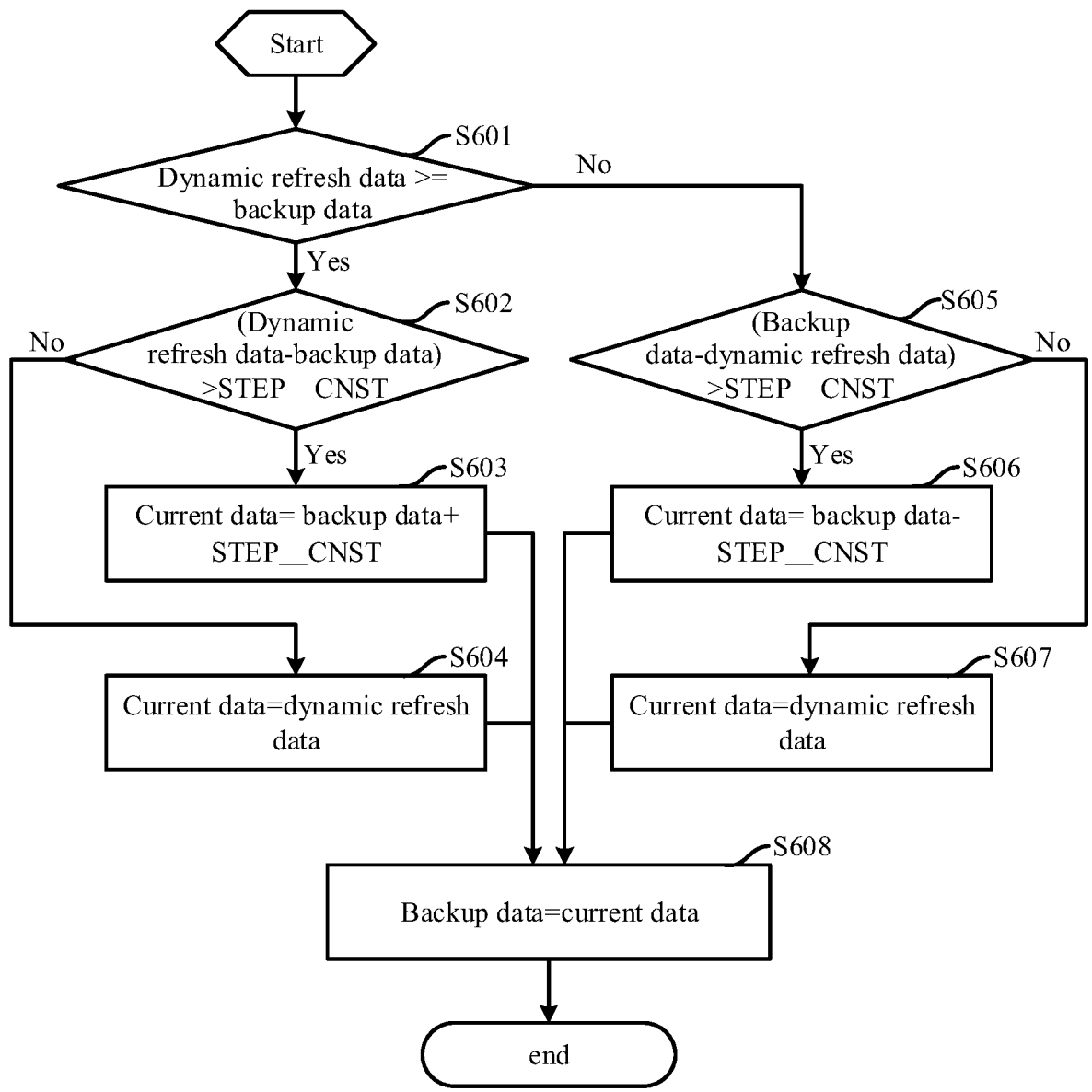
FIG. 7 is a flow diagram of PWM smoothing process according to embodiments of the present disclosure.

FIG. 7 exemplarily shows a process of smoothing processing. As shown in FIG. 7, the process may include the following operations.

S601: determining whether the real-time dynamic refresh data are greater than or equal to the backup data in the previous execution cycle or not; if the real-time dynamic refresh data are greater than or equal to the backup data in the previous execution cycle, going to S602; otherwise, going to S605.

S602: determining whether the difference obtained by subtracting the backup data in the previous execution cycle from the real-time dynamic refresh data is greater than the set value STEP_CNST or not; if the difference obtained by subtracting the backup data in the previous execution cycle from the real-time dynamic refresh data is greater than the set value STEP_CNST, going to S603; otherwise, going to S604.

S603: setting current backlight brightness as the sum of the backup data in the previous execution cycle and the set value STEP_CNST, and going to S608.

S604: setting the current backlight brightness to be equal to the real-time dynamic refresh data, and going to S608.

S605: determining whether the difference obtained by subtracting the real-time dynamic refresh data from the backup data in the previous execution cycle is greater than the set value STEP_CNST or not, if the difference obtained by subtracting the real-time dynamic refresh data from the backup data in the last execution cycle is greater than the set value STEP_CNST, going to S606; otherwise, going to S607.

S606: setting the current backlight brightness to be the difference obtained by subtracting the set value STEP_CNST from the backup data in the previous execution cycle, and going to S608.

S607: setting the current backlight brightness to be equal to the real-time dynamic refresh data, and going to S608.

S608: backing up the real-time dynamic refresh data of the current execution cycle.

As can be seen from the above description, after the main controller generates the backlight control information, the main controller caches the backlight control information first, and then outputs the backlight control information to the backlight controller after determining that the initialization of the backlight controller has been completed.

In this way, since the initialization of the backlight controller is completed before output of the light strip brightness information, that is, the initialization of the backlight controller is keeping pace with preparation of backlight control data, and the backlight control data meet the panel start timing required by the backlight controller, a blurred screen of the display device will be avoided.

Especially when the display device is awakened by means of some predefined wake-up modes, since the backlight of the display panel has not been turned on or lit when the display device is awakened, the backlight control information is first generated; and if the backlight control information is output to the backlight controller immediately when the backlight of the display panel is turned on, a blurred screen of the display panel may occur due to the facts that the initialization of the backlight controller is not completed and the backlight control data does not need to meet the panel start timing required by the backlight controller.

According to the embodiments of the present application, the main controller outputs the backlight control information to the backlight controller after confirming that the backlight controller has been initialized, so that the backlight control data can meet the panel start timing required by the backlight controller, and therefore a blurred screen of the display device can be avoided.

It is noted that the above embodiments of the present disclosure only illustrates the main steps in the backlight control flow. In some implementations, according to the type or model of the main controller and backlight controller used, some other processing procedures may be included in the backlight control flow.

Based on the above-mentioned embodiments, in a specific scenario, the specific implementation process of the embodiments of the present application will be described below.

Figure 8:
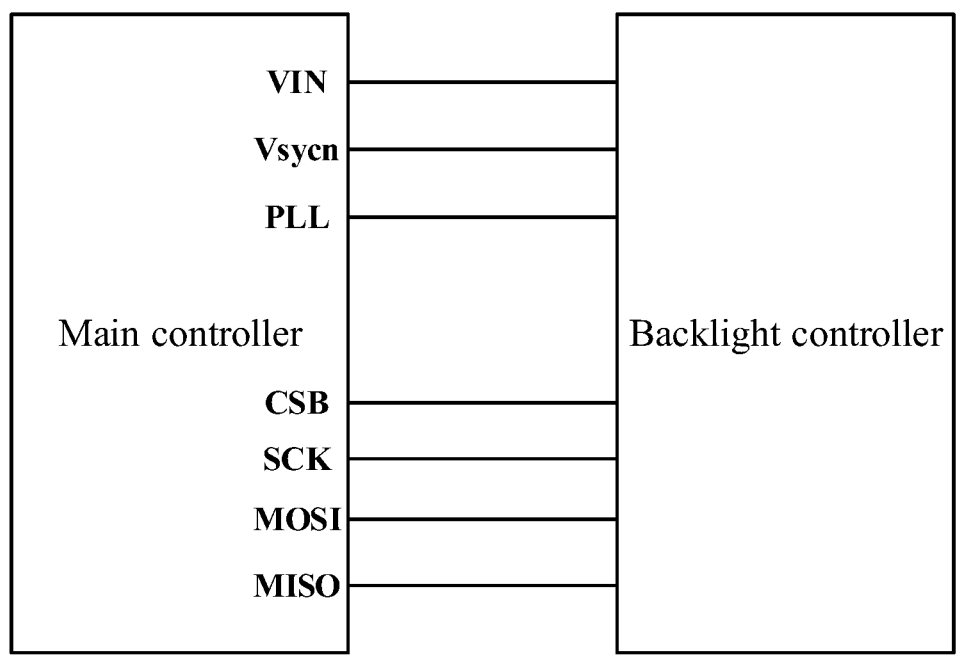
FIG. 8 is a diagram showing connection between a main controller and a backlight controller according to embodiments of the present disclosure.

FIG. 8 exemplarily shows a diagram showing connection between the main controller and the backlight controller.

A general-purpose input/output (GPIO) port of the main controller is connected with a GPIO port of the backlight controller. As shown in FIG. 8, a Vsync port, a VIN port, a PLL port (clock port), and interfaces (such as CSB port, SCK port, MOSI port and MISO port in FIG. 8) of the main controller associated with SPI protocol are connected with corresponding ports of the backlight controller. The Vsync port is used for realizing synchronization, the VIN port is used for providing power voltage for the backlight controller, and the associated SPI protocol interfaces are used for realizing information communication with the backlight controller.

Figure 9:
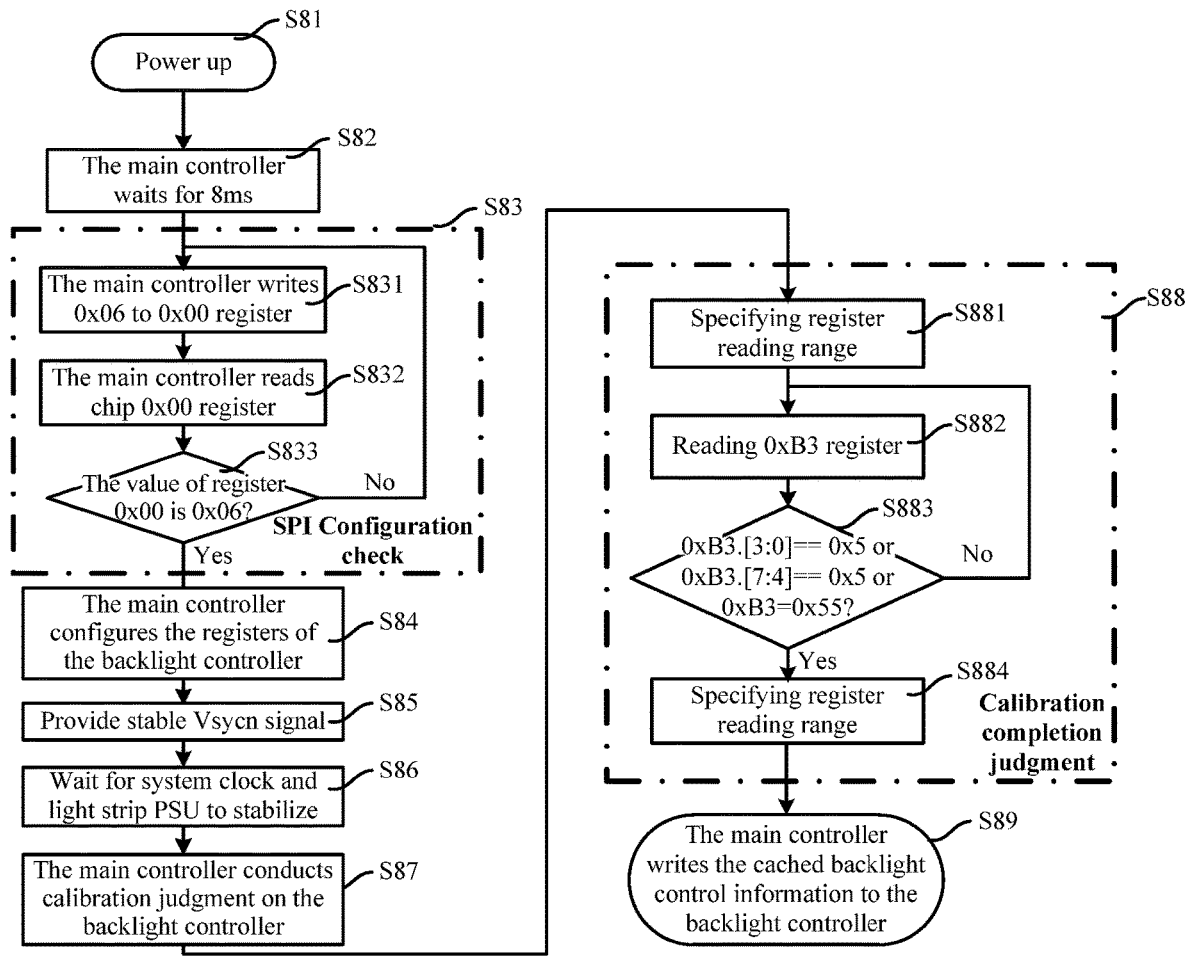
FIG. 9 is a flow diagram of backlight control according to embodiments of the present disclosure.

Based on FIG. 8, FIG. 9 shows an initialization flow of the backlight controller. As shown in the figures, the flow may include the following operations.

S81: the main controller powers up the backlight controller.

In this step, the main controller generates backlight control information when the display device is awakened and then caches the generated backlight control information. When the main controller receives a startup instruction sent from a user through the remote control, the level of the GPIO interface is pulled up firstly, so that the backlight controller is powered up for initialization, and meanwhile, the main controller controls a Vsync signal to be in a low level state.

S82: the main controller waits until the backlight controller completes initialization, which takes about 8 ms.

Since this satisfies power-on timing requirement of the backlight controller, a backlight controller circuit is stable, VIN (input voltage) is greater than 7 volts, and the time required for testing is about 8 ms, so the main controller needs to wait about 8 ms for initialization of the backlight controller.

S83: the main controller checks SPI configuration of the backlight controller to confirm that SPI communication is normal.

In this step, the main controller writes 0x06 to the 0x00 register of the backlight controller (see S831 in FIG. 9), and then reads the 0x00 register of the backlight controller (see S832 in FIG. 9). If the value of the 0x00 register is 0x06, it indicates that the SPI configuration of the backlight controller is normal, and the method goes to S84; otherwise, it indicates that the SPI configuration of the backlight controller is abnormal; when the configuration is abnormal, the SPI configuration check process can be repeated till the SPI configuration of the backlight controller is normal (see S833 in FIG. 9).

S84: the main controller configures the registers of the backlight controller.

In this step, the main controller writes configured partitioning data into the registers of the backlight controller: 0x00~0x39 and 0x40~0x65. The main controller further controls a PWM signal to meet the requirements of the backlight controller.

S85: the main controller provides a stable Vsync pulse signal, where the pulse signal meets the minimum pulse width requirement of the Vsync signal, i.e., greater than 20 us.

S86: the main controller waits until a light strip power supply unit (PSU) becomes stabilized and an internal clock of the backlight controller becomes stabilized.

In this step, the main controller waits until a light strip power supply is stabilize and the internal clock of the backlight controller is stabilized. If the backlight controller adopts a PhaseLockedLoop (PLL) clock operation mode, the main controller further needs to wait for an internal PLL to be stabilized. The time for the internal PLL clock to be stabilized is about 500 ms. If the backlight controller adopts an oscillator (OSC) or external clock (External CLK), the main controller only needs to wait for the output voltage of the light strip power supply to stabilize.

The system may be designed to wait for 50 ms by default. After the light strip power supply is stable, follow-up operations will be carried out.

S87: the main controller conducts calibration judgment on the backlight controller.

In this step, after the light strip power supply is stable, the backlight controller exits from a reset state. After the backlight controller exits from the reset state, the set register value takes effect. The main controller sets bit 0 of the 0x00 register of the backlight controller to be 1, and conducts calibration completion judgment on the backlight controller.

S88: the main controller conducts calibration completion judgment on the backlight controller.

In this process, the main controller specifies that the register reading range is >==0x80, and sets bit7 of the 0x78 register to be 1 (see S881 in FIG. 9); the main controller reads the 0xB3 register (see S882 in FIG. 9); the main controller judges whether the backlight controller completes calibration or not according to the value of the 0xB3 register; if the calibration is completed, the main controller specifies that the register reading range is <0x80, and sets bit 7 of the 0x78 register to be 0 (see S884 in FIG. 9); and otherwise, the method goes to S882 to repeat the calibration completion judgment (see S883 in FIG. 9).

The 0xB3 register will be identified after the backlight controller completes calibration and enters a normal operation state.

The 0xB3 register is defined as follows.

(1) When U0_ST[3:0]=0x5, it means that a path powered by a first DCDC power supply (DCDC circuit connected to FB1) has entered a normal operation state.

(2) When U1_ST[3:0]=0x5, it means that a path powered by a second DCDC power supply (DCDC circuit connected to FB2) has entered a normal operation state.

S89: the backlight controller enters an OTF (on the fly) state, namely the operation state, and after calibration is completed, the main controller writes the cached backlight control information to the backlight controller.

In some scenarios, when the display panel is turned on after being turned off, the timing of an SW signal and the Vsync signal needs to satisfy: the level of the Vsync signal stays low when the SW signal is pulled high, otherwise a flash screen may occur after the panel is turned on. In order to solve the above-mentioned problems, in some embodiments of the disclosure, the main controller may force the Vsync signal to be pulled down upon receiving a signal for turning off the panel of the display device.

Based on the same technical concept, the embodiments of the disclosure further provide a device for controlling backlight of a display panel. The device can be the main controller in the previous embodiments.

Figure 10:
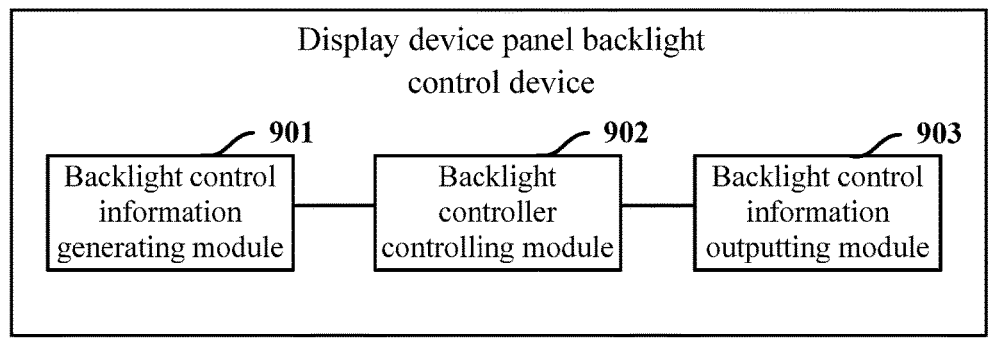
FIG. 10 is a structural schematic diagram of a screen backlight control device according to embodiments of the present disclosure.

As shown in FIG. 10, the device may include a backlight control information generating module 901, a backlight controller module 902, and a backlight control information outputting module 903.

The backlight control information generating module 901 is configured to generate backlight control information and cache the backlight control information in response to the display device being awakened.

The backlight controller module 902 is configured to start a backlight controller to initialize the backlight controller.

The backlight control information outputting module 903 is configured to output the backlight control information to the backlight controller in response to completion of initialization of the backlight controller, to cause the backlight controller to control the backlight of the panel of the display device according to the backlight control information.

In some embodiments of the present disclosure, the backlight controller module 902 is configured to start the backlight controller in response to a command for turning on the backlight.

In some embodiments of the present disclosure, the backlight control information outputting module 903 is configured to acquire information for indicating operation state of the backlight controller; and in response to that the information indicates the operation state of backlight controller is initialization completion, output the backlight control information to the backlight controller.

In some embodiments of the present disclosure, the backlight control information outputting module 903 is configured to read a bit sequence of a register used to identify the operation state in the backlight controller, and read a value of a subsequence at a specified position in the bit sequence, where the value of the subsequence at the specified position indicates the operation state of the backlight controller.

In some embodiments of the present disclosure, the backlight control information generating module 901 is configured to: generate brightness information of at least one light strip arranged on a backlight of the panel of the display device; generate a pulse width modulation (PWM) duty ratio for backlight control; and according to the brightness information of the at least one light strip and the PWM duty ratio, obtain the backlight control information.

In some embodiments of the present disclosure, the backlight control information generating module 901 is used for processing the brightness information of the at least one light strip and the PWM duty ratio to obtain the backlight control information, where the processing includes: integrating the brightness information of the at least one light strip with the PWM duty ratio, and clipping the integrated light strip control information.

In some embodiments of the present disclosure, the backlight control information generating module 901 is configured to generate the backlight control information and cache the backlight control information in response to the display device being awakened by means of a predefined wake-up mode, where when the display device is awakened by means of the predefined wake-up mode, the backlight for the panel of the display device has not been turned on.

Based on the same technical concept, the embodiments of the present disclosure further provide a display device. The display device includes a display panel, a backlight source, a main controller and a backlight controller. The main controller can realize the functions of the main controller in the aforementioned embodiments of the present disclosure, and the backlight controller can realize the functions of the backlight controller in the aforementioned embodiments of the present disclosure.

In the present embodiments, the concepts, explanations, detailed descriptions and other steps related to the display device and the technical scheme provided in the present embodiments are described in the description of these contents in the foregoing method embodiment, which will omit here.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device comprising:
  a panel;
  a backlight source configured to provide backlight for the panel; and
  a main controller configured to:
    in response to an instruction for awakening the display device, generate backlight control information and cache the backlight control information;
    start a backlight controller to initialize the backlight controller; and
    in response to completion of initialization of the backlight controller, output the backlight control information to the backlight controller, to cause the backlight controller to control the backlight source according to the backlight control information;
  wherein the backlight controller is configured to start initialization in response to a startup control command from the main controller, and control the backlight source in response to the backlight control information output from the main controller;
  wherein the main controller is configured to output the backlight control information to the backlight controller by acquiring information for indicating an operation state of the backlight controller, and in response to the information indicating the operation state of the backlight controller is initialization completion, outputting the backlight control information to the backlight controller;
  wherein the main controller is configured to acquire the information for indicating the operation state of the backlight controller by reading a bit sequence of a register used to identify the operation state in the backlight controller, and reading a value of a subsequence at a specified position in the bit sequence; and
  wherein the value of the subsequence at the specified position indicates the operation state of the backlight controller.

2. The display device according to claim 1, wherein the main controller is configured to start the backlight controller by:
   starting the backlight controller in response to a command for turning backlight on.

3. The display device according to claim 1, wherein the main controller is configured to generate the backlight control information by:
   generating brightness information of at least one light strip arranged on a backlight of the panel of the display device;
   generating a pulse width modulation (PWM) duty ratio for backlight control; and
   according to the brightness information of the at least one light strip and the PWM duty ratio, obtaining the backlight control information.

4. The display device according to claim 3, wherein the main controller is configured to obtain the backlight control information according to the brightness information of the at least one light strip and the PWM duty ratio by:
   integrating the brightness information of the at least one light strip with the PWM duty ratio; and
   performing clipping processing on the integrated light strip control information and obtain the backlight control information.

5. The display device according to claim 1, wherein the main controller is configured to generate and cache the backlight control information in response to the instruction for awakening the display device by:
   in response to an instruction for awakening the display device by a predefined wake-up mode, generating the backlight control information and cache the backlight control information;
   wherein when the display device is awakened by the predefined wake-up mode, the backlight for the panel of the display device has not been turned on.

6. A method for controlling backlight of a panel of a display device, the method comprising:
   generating backlight control information and caching the backlight control information, by a main controller, in response to an instruction for awakening the display device;
   starting, by the main controller, a backlight controller, to initialize the backlight controller; and
   outputting, by the main controller, the backlight control information to the backlight controller, in response to completion of initialization of the backlight controller, to cause the backlight controller to control a backlight source of the display device according to the backlight control information;
   wherein outputting the backlight control information to the backlight controller comprises acquiring, by the main controller, information for indicating an operation state of the backlight controller, and in response to the information indicating that the operation state of the backlight controller is initialization completion, outputting, by the main controller, the backlight control information to the backlight controller;
   wherein acquiring the information for indicating the operation state of the backlight controller comprises reading, by the main controller, a bit sequence of a register used to identify the operation state in the backlight controller, and reading a value of a subsequence at a specified position in the bit sequence; and
   wherein the value of the subsequence at the specified position indicates the operation state of the backlight controller.

7. The method according to claim 6, wherein starting, by the main controller, the backlight controller comprises:
   starting the backlight controller, by the main controller, in response to a command for turning backlight on.

8. The method according to claim 6, wherein generating the backlight control information comprises:
   generating brightness information of at least one light strip arranged on a backlight of the panel of the display device;
   generating a pulse width modulation (PWM) duty ratio for backlight control; and
   according to the brightness information of the at least one light strip and the PWM duty ratio, obtaining the backlight control information.

9. The method according to claim 8, wherein obtaining the backlight control information according to the brightness information of the at least one light strip and the PWM duty ratio comprises:
   integrating the brightness information of the at least one light strip with the PWM duty ratio; and
   performing clipping processing on the integrated light strip control information to obtain the backlight control information.

10. The method according to claim 6, wherein generating the backlight control information and caching the backlight control information, by the main controller, in response to the instruction for awakening the display device comprises:
    in response to an instruction for awakening the display device by a predefined wake-up mode, generating the backlight control information and caching the backlight control information, by the main controller;
    wherein when the display device is awakened by the predefined wake-up mode, the backlight for the panel of the display device has not been not turned on.

* * * * *